Aug. 24, 1937.   C. H. McKINSTRY   2,091,008
FLUID PRESSURE BRAKE
Filed Oct. 8, 1935   3 Sheets-Sheet 1

INVENTOR
CHARLES H. McKINSTRY
BY *Wm. M. Cady*
ATTORNEY

Patented Aug. 24, 1937

2,091,008

UNITED STATES PATENT OFFICE 2,091,008

FLUID PRESSURE BRAKE

Charles H. McKinstry, Wilmerding, Pa., assignor to The Westinghouse Air Brake Company, Wilmerding, Pa., a corporation of Pennsylvania Application October 8, 1935, Serial No. 43,999

18 Claims. (Cl. 303—40)

This invention relates to fluid pressure brakes and more particularly to locomotive brake equipment of the type disclosed in the U. S. Patent No. 2,009,840, issued July 30, 1935, to Clyde C. Farmer and Ellis E. Hewitt; in my application Serial No. 690,685, filed September 23, 1933 and resulting in Patent No. 2,045,159, issued June 23, 1936; and in the U. S. Patent 2,009,841, issued July 30, 1935 to Ellis E. Hewitt.

The brake equipments disclosed in the above-identified patents employ a distributing valve having an equalizing portion which employs a piston subject to the opposing pressures of the fluid in the brake pipe and of the fluid in a pressure chamber. A feed groove is provided and extends around this piston so that the pressure chamber may be charged with fluid under pressure from the brake pipe on an increase in the pressure of the fluid in the brake pipe.

A piston seal is also provided, and on a rapid increase in the pressure of the fluid in the brake pipe, such as occurs in initially charging the equipment, or in releasing the brakes, the piston is moved into engagement with this seal, thereby restricting the rate of flow of fluid to the pressure chamber to a choked passage through which fluid may flow at a rate less rapid than the rate at which fluid may flow through the feed groove. This reduction in the rate of flow of fluid to the pressure chamber prevents overcharging of the pressure chamber during initial charging of the equipment or during a release of the brakes, thereby eliminating the possibility of an unintended brake application as the result of the subsequent reduction in brake pipe pressure upon equalization of the pressure in the brake pipe throughout the train.

It has been found, however, in passenger train service, which trains are much shorter than freight trains, that there is less possibility of an overcharge of the pressure chamber than in freight train service, as in passenger train service the engineer's brake valve device is left in the release position a much shorter time than is the practice in freight train service, and as a result, a more rapid rate of recharge of the pressure chamber may be employed in the brake equipment when used in passenger service than may be employed when the equipment is used in freight train service.

In addition, in the brake equipment disclosed in my Patent No. 2,045,159, and in the U. S. Patent No. 2,009,841 to Ellis E. Hewitt, means is provided to condition the equipment to permit either a rapid rate of build-up of brake cylinder pressure on the locomotive during an emergency application of the brakes, or to restrict the rate of build-up of brake cylinder pressure at this time.

When the equipment is conditioned to restrict the rate of build-up of the locomotive brake cylinder pressure, the flow of fluid to the application piston, which governs the rate of build-up of brake cylinder pressure, is regulated by a restricted passage and by the flow of fluid from this passage to an application chamber as well as to the application piston chamber.

In releasing the brakes after an emergency application, with the equipment conditioned to restrict the rate of build-up of locomotive brake cylinder pressure, the rate of reduction in brake cylinder pressure is governed by the rate at which the pressure of the fluid acting on the application piston is reduced, and this pressure will be reduced at a slow rate because of the restricted capacity of the passage through which fluid flows to and from the application piston, with the result that the brakes will be released slowly.

In addition, in the braking systems shown in the above identified patents on an emergency application of the brakes fluid under pressure is supplied by operation of the automatic brake valve device to the application piston chamber through the application pipe at the pressure supplied by the feed valve employed in the equipment, while fluid is also supplied to the application piston chamber from the pressure chamber by operation of the equalizing portion of the distributing valve.

In order to limit the pressure of the fluid supplied to the application piston, and thereby limit the pressure of the fluid supplied to the brake cylinder by operation of the application portion of the distributing valve, a safety valve is provided and operates to release fluid under pressure from a passage connected to the application piston chamber on an increase in the pressure of the fluid in this passage to a predetermined value.

It has been found that the pressure of the fluid supplied to the safety valve may increase less rapidly than the pressure of the fluid supplied to the application piston chamber, with the result that the safety valve will not operate to release fluid until the pressure of the fluid supplied to the application piston chamber has built up to a value above that for which the safety valve is adjusted to operate and that thereby a degree of brake cylinder pressure above that intended is secured.

An object of this invention is to provide a brake equipment of the type described and incorporating optionally operable means to increase the flow capacity of the passage connecting the brake pipe and the pressure chamber when the piston of the equalizing portion is in the inner release position, whereby the rate of recharging of the pressure chamber associated with the equalizing portion may be optionally varied.

A further object of the invention is to provide a brake equipment of the type described and having a passage through which fluid may be supplied from the brake pipe to the pressure chamber associated with the equalizing portion of the equipment on movement of the piston of the equalizing portion to a release position, this passage having valve means associated therewith by means of which the flow of fluid through the passage may be cut off when desired, and also having a check valve interposed therein and operative to permit fluid to flow from the brake pipe to the pressure chamber and to prevent back flow of fluid from the pressure chamber to the brake pipe.

Another object of the invention is to provide a brake equipment of the type described and having optionally operable means operative to restrict the rate of flow of fluid to the application piston chamber when an emergency application of the brakes is effected and thereby restrict the rate of build-up of brake cylinder pressure on the locomotive, and having, in addition, means to permit the release of fluid from the application piston chamber at a relatively rapid rate while the equipment is conditioned to restrict the rate of flow of fluid to the application piston chamber, whereby the brakes may be released very rapidly.

A further object of the invention is to provide a brake equipment of the type described and having means operative on an emergency application of the brakes to supply fluid under pressure to the application piston chamber from the pressure chamber and also from the main reservoir by way of an application pipe, together with a safety valve to limit the pressure of the fluid supplied to the application piston chamber, and having means to insure that the rate of increase in the pressure of the fluid supplied to the safety valve will be substantially the same as that of the fluid supplied to the application piston chamber, whereby the safety valve will operate to prevent a further increase in the pressure of the fluid supplied to the application piston chamber when the pressure of the fluid supplied to the application piston chamber has increased to a value substantially equal to that for which the safety valve is adjusted to operate.

Another object of the invention is to provide an improved brake equipment adapted for use on locomotives.

Other objects of the invention and features of novelty will be apparent from the following description taken in connection with the accompanying drawings, in which.

Figure 1:
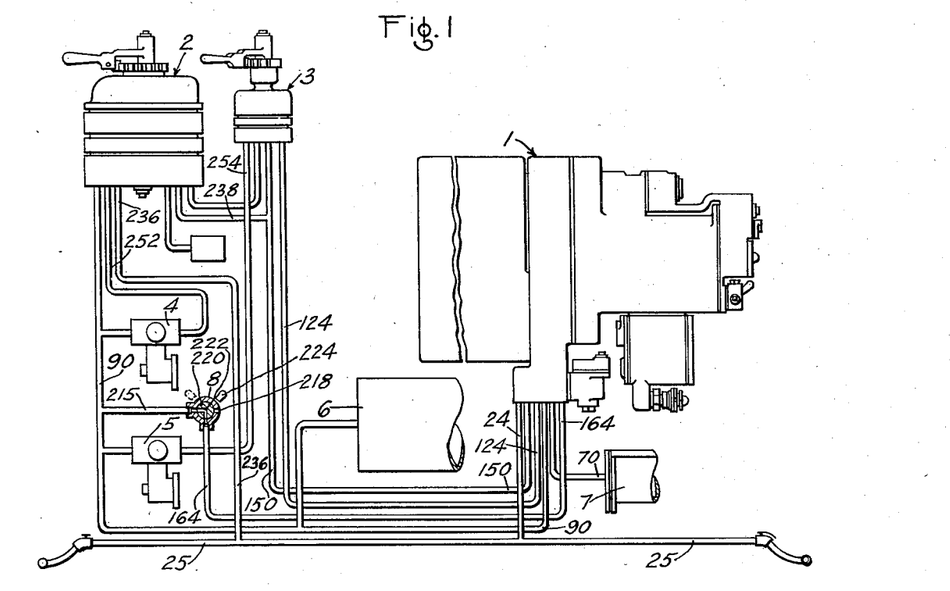
Fig. 1 is a diagrammatic view of a brake equipment embodying my invention.

As shown in the drawings the equipment comprises a distributing valve 1, an engineer's brake valve device comprising an automatic portion 2 and an independent portion 3, a feed valve 4, a reducing valve device 5, a main reservoir 6, a brake cylinder 7, and a delay control valve device 8.

The distributing valve device 1 comprises an equalizing portion 10, an application portion 11, a reduction limiting and control valve device 12, a release valve device 13, a safety valve device 14, an emergency change-over brake cylinder build-up valve device 15, and a charging control valve device 16.

The distributing valve device 1, and the other portions of the apparatus employed in the system shown in this application, with the exceptions which are hereinafter particularly pointed out, are substantially the same in construction and operation as the corresponding apparatus employed in the aforementioned patents, and only such portions of the apparatus are disclosed and described in this application, and only the portions of the operation of the equipment are described as are essential to the understanding of the improvements provided by this invention.

The equalizing portion 10 of the distributing valve device 1 comprises a piston 20 having at one side a piston chamber 22 which is connected by way of a passage and pipe 24 with the brake pipe 25, and having at its other side a valve chamber 28 containing a main slide valve 29 and an auxiliary slide valve 30 adapted to be operated by the piston 20 through the medium of a stem 21 associated with the piston.

The valve chamber 28 communicates by way of a passage 33 with a chamber 35, which is in constant communication with the pressure chamber 37 by way of a passage 38.

The outer end of the piston chamber 22 is closed by a cap member 40, a gasket 41 being clamped between the member 40 and the casing of the distributing valve device so as to prevent the leakage of fluid under pressure from the piston chamber to the atmosphere. A portion of this gasket extends into the piston chamber against which portion the equalizing piston 20 is adapted to seal when the piston is moved to the emergency position.

Figure 4:
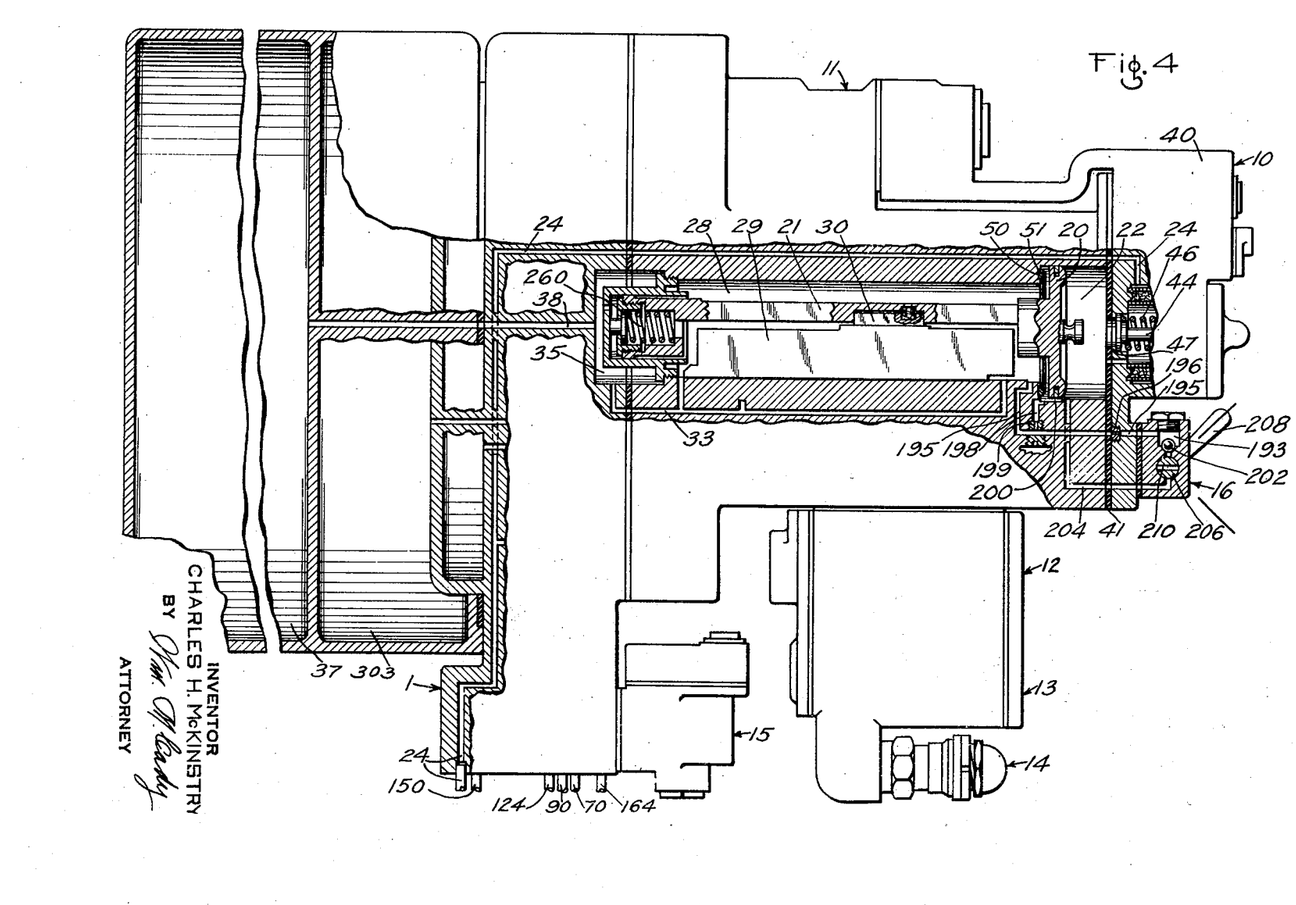
Fig. 4 is a view partly in section of the distributing valve employed in the equipment shown in Fig. 1.
Figure 5:
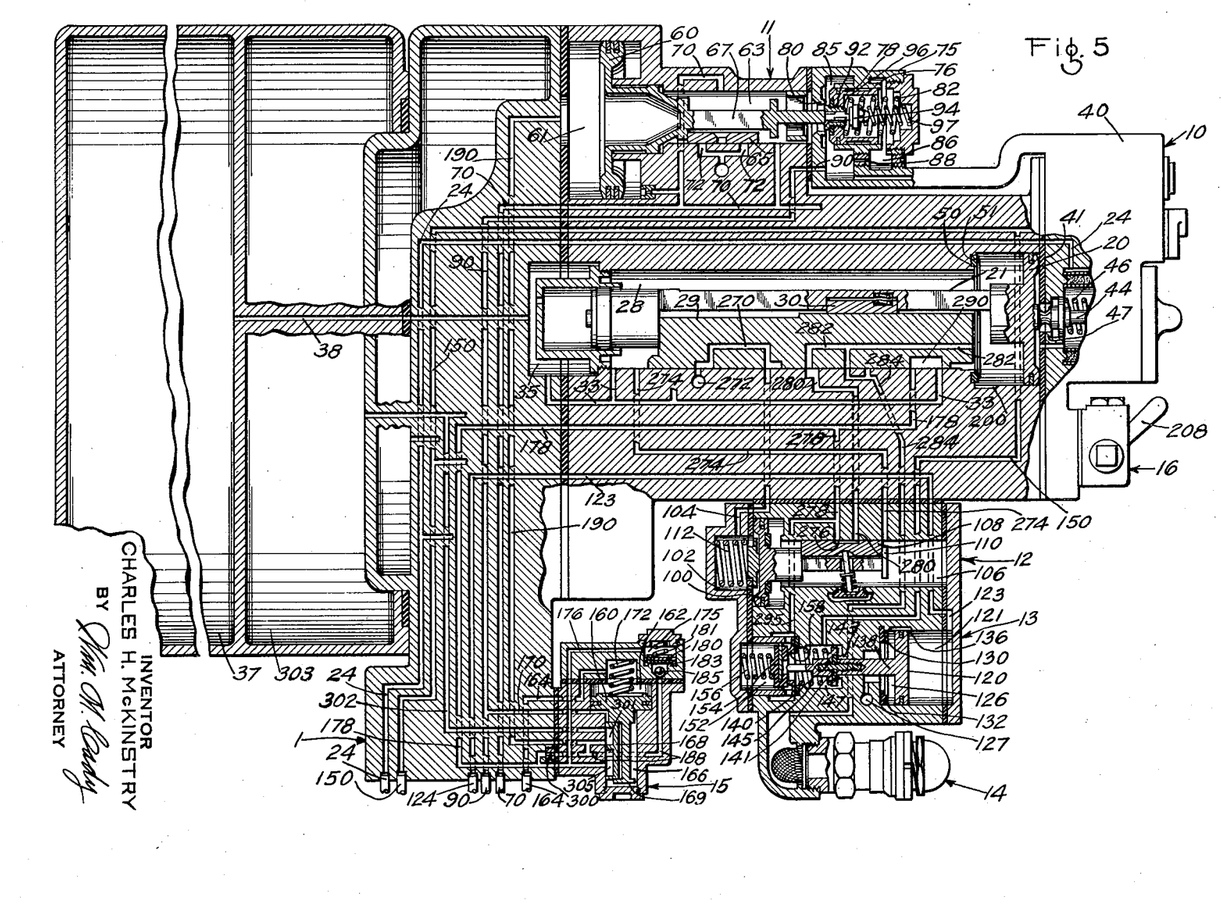
Fig. 5 is a view largely in section of the distributing valve employed in the equipment shown in Fig. 1.

Slidably mounted in the cap member 40 is a piston stop 44 which is urged towards the equalizing piston 20 by means of the coil spring 46, the inward movement of the stop 44 being limited by engagement of the stop with a flange 47 formed on the cap member 40 as shown in Figs. 4 and 5 of the drawings.

An annular gasket 50 is mounted in a recess in the radially extending wall outwardly of the valve chamber 28 and is provided with a sealing rib 51 which is adapted to be engaged by the face of the piston 20.

The application portion 11 of the distributing valve device 1 comprises a piston 60 having at one side thereof a piston chamber 61, and having at the other side an application valve chamber 63 in which is mounted a brake cylinder exhaust slide valve 65, which is adapted to be operated by means of a stem 67 with which the application piston 60 is provided. The valve chamber 63 is in constant communication with the brake cylinder 7 by way of a passage and pipe 70, while the slide valve 65 controls communication between the chamber 63 and the atmosphere by way of the passages 72.

The application piston 60 besides being adapted to shift the slide valve 65 is also adapted to control the operation of the brake cylinder supply valve device 75.

The supply valve device 75 comprises a casing which is secured to the casing of the application portion 11, and which is provided with an interior annular guide 76 having slidably mounted therein a valve piston 78 which is urged by means of a spring 82 into engagement with an annular seat rib 80 which surrounds a passage leading to the valve chamber 63. The casing of the device together with the valve piston 78 defines chambers 85 and 86 which are connected by way of a restricted passage 88. The chamber 85 is in constant communication with the main reservoir by way of a passage and pipe 90.

The valve piston 78 is provided with a member 92 which is adapted to be engaged by the end of the piston stem 67, and which has a bore extending therethrough in which is mounted a pilot valve 94, which is urged into engagement with a seat rib 96 on the member 92 by means of a spring 97 positioned in the chamber 86. The pilot valve 94 is provided with a stem, which, when the pilot valve is in engagement with the seat rib 96, projects from the face of the member 92 so as to be engaged by the end of the stem 67 before the member 92 is engaged thereby.

The reduction limiting valve device 12 is associated with the equalizing portion of the distributing valve device 1, and in initiating a service application of the brakes functions to delay the application of the locomotive brakes for a selected period of time.

The reduction limiting valve device 12 comprises a casing which is secured to the equalizing portion of the distributing valve device, and which has a bore therein in which is mounted a piston 100 having at one side thereof a chamber 102 which is connected by way of a passage 104 with a port in the seat of the main slide valve 29 of the equalizing portion.

At the other side of the piston 100 is a valve chamber 106 in which is mounted a slide valve 108 which is adapted to be operated by means of the stem 110 associated with the piston 100. A spring 112, mounted in the chamber 102, normally urges the piston 100 to the right as viewed in Fig. 5 of the drawings, while the piston 100 is moved against the spring by fluid under pressure in the chamber 106.

The release valve device 13 is provided for the purpose of controlling the release of the locomotive brakes independently of the operation of the equalizing portion of the distributing valve device, and, as shown, comprises a piston 120 having at one side thereof a chamber 121 which is connected by way of a passage 123 with the independent release pipe 124. The piston 120 has at the other side thereof a chamber 126 which is connected to the atmosphere by way of a passage 127, while an annular gasket 130 is secured against the end wall of the bore in which the piston is mounted and is provided with a sealing rib 132 which is adapted to be engaged by the face of the piston to cut off communication with the atmosphere by way of the passage 127. A groove 136 is formed in the wall of the bore in which the piston 120 is mounted, and in one position of the piston extends around the piston so as to establish communication between the chamber 121 and the chamber 126, and therefrom to the atmosphere by way of the passage 127.

The piston 120 has a stem 138 formed integral therewith and slidably mounted in a bore in the body of the valve device, and this stem has secured on the end thereof a valve 140 having a sealing gasket 141 associated therewith and adapted to engage a seat rib 143 which surrounds the bore in which the stem 138 is mounted. The valve 140 is urged by means of a spring 145 into engagement with the seat rib 143. The spring 145 is mounted in a chamber 147 which is constantly connected with the application pipe and passage 150.

The body of the release valve device 13 includes, in addition, a valve chamber 152 in which is mounted the valve 154 which is urged by means of a spring 156 into engagement with a seat rib 158 surrounding a passage communicating with the chamber 147, the valve 154 being adapted to be engaged by the end of the stem 138 of the piston 120.

The safety valve device 14 may be of any suitable, well known construction and is operated on an increase to a predetermined value in the pressure of fluid supplied thereto to release fluid under pressure and thereby prevent a further build-up in the pressure of the fluid in the passage controlled thereby.

The emergency change-over brake cylinder build-up valve device 15 comprises a piston 160 having at one side a chamber 162 which is constantly connected to the delay control pipe 164. The piston 160 has at the other side a valve chamber 166 in which is mounted a slide valve 168 which is adapted to be operated by the stem 169 associated with the piston 160. The chamber 166 is constantly connected to the main reservoir 6 by way of a passage 170 which communicates with the main reservoir passage and pipe 90, while a spring 172 is positioned in the chamber 162 and urges the piston downwardly as viewed in Fig. 5 in the drawings.

The valve device 15 also includes a check valve, which as shown in the drawings, comprises a valve chamber 175 which is connected by way of a passage 176 to a passage 178 which communicates with a port in the seat of the main slide valve 29. The valve chamber 175 has mounted therein a valve element 180 which is urged by a spring 181 into engagement with a seat rib 183 surrounding a chamber in which is mounted a ball check valve element 185 which engages a seat surrounding the end of a passage 188 which communicates with a passage 190 which leads to the chamber 61 on the face of the application piston 60.

The construction of the charging control valve device 16 is best shown in Fig. 4 of the drawings, and as therein illustrated comprises a body secured to the cap member 40 and having a chamber 193 therein which is constantly connected by way of a passage 195 having a restricted portion 196 therein with the slide valve chamber 28, while a branch passage 198 communicates with the passage 195 through a choke or restricted portion 199 and with the feed groove 200, which, in both release positions of the piston 20, establishes communication between the passage 198 and the chamber 22.

The valve chamber 193 has mounted therein a ball check valve element 202 which engages a seat surrounding the end of a passage 204 which communicates with the chamber 22 at a point adjacent the end of the feed groove 200, while a plug valve 206 is provided to control communication through the passage 204, this valve being adapted to be operated by means of a handle 208, and in one position of the handle 208 the valve cuts off communication through the passage 204, while in another position of the handle 208 a passage 210 through the plug valve 206 establishes communication through the passage 204.

The delay control valve device 8 controls communication between the main reservoir pipe 90 and the delay control pipe 164, and between the delay control pipe 164 and the atmosphere. As is best shown in Fig. 1 of the drawings the delay control valve device 8 comprises a casing having a port therein to which is connected the end of the delay control pipe 164, a port which is connected by way of a pipe 215 with the main reservoir pipe 90, and an atmospheric exhaust port 218. The valve device 8 includes, in addition, a plug valve 220 having an angular passage 222 therein. The plug valve 220 is adapted to be operated by means of a handle 224, and in one position of this handle the angular passage 222 establishes communication between the pipe 215 and the delay control pipe 164 so as to permit fluid from the main reservoir to flow to the delay control pipe, and in another position of the handle 224 the angular passage 222 establishes communication between the delay control pipe 164 and the atmospheric exhaust port 218 so as to release fluid under pressure from the delay control pipe, while at the same time the plug valve cuts off the supply of fluid from the main reservoir to the delay control pipe by way of the pipe 215.

The automatic brake valve device 2 is of the usual construction and comprises a casing having a chamber 230 therein in which is mounted a rotary valve 232 which is adapted to be operated by means of a handle 234. The seat of the rotary valve 232 has a port therein which communicates by way of a passage and pipe 236 with the brake pipe 25, while another port in the seat of the rotary valve 232 communicates by way of a passage and pipe 238 with the application pipe 150.

The independent brake valve device 3 is of the usual construction and comprises a casing having a chamber 245 therein in which is mounted a rotary valve 247 which is adapted to be operated by means of a handle 249, while the application pipe 150 and the independent brake pipe 124 are connected with ports in the seat of the rotary valve 247.

The feed valve device 4 may be of the usual construction and is adapted to supply fluid at a reduced pressure as carried in the brake pipe by way of a pipe 252 to a passage in the automatic brake valve device 2.

The reducing valve device 5 may be similar in construction to the feed valve device 4, and is adapted to supply fluid at a desired reduced pressure, such as that employed in controlling the brakes by operation of the independent brake valve device 3, to a pipe 254 which communicates with a port in the seat of the rotary valve 247 of the independent brake valve device.

*Initial charging*

In charging the equipment the independent brake valve device is turned to the running position in which position the rotary valve in the independent brake valve device connects the independent release pipe 124 to the atmosphere and laps the application pipe 150. Also in initially charging the equipment the rotary valve of the automatic brake valve device is turned first to the release position, and after a period of time has elapsed, it is then turned to the running position.

When the rotary valve of the automatic brake valve device is in the release position fluid at main reservoir pressure flows to the pipe 236 and therefrom to the brake pipe 25 and to the branch pipe 24 which leads to the distributing valve device 1. Fluid under pressure supplied to the pipe 24 flows to the passage 24 in the distributing valve device 1 and therefrom to the piston chamber 22.

On a rapid increase in the pressure of the fluid in the chamber 22, such as is produced when fluid is supplied to the brake pipe directly from the main reservoir, the piston 20 is moved to the left as viewed in Fig. 4 of the drawings to the inner release position, so as to compress the spring 260 with the result that the piston 20 is moved into engagement with the seat rib 51 on the sealing gasket 50.

In this position of the piston 20 communication is permitted from the chamber 22 to the feed groove 200, but the flow of fluid to the valve chamber 28 from the feed groove past the seat rib 51 is cut off. Fluid will, therefore, flow from the chamber 22 through the feed groove to the passage 198 and through the restricted portion 199 to the passage 195, and therefrom to the valve chamber 28 and to the pressure chamber 37 by way of the passage 38, charging this chamber with fluid under pressure. In this position of the piston 20 the rate of flow of fluid to the valve chamber 28 and to the pressure chamber 37 will be governed by the capacity of the restricted passage 199, and, as this passage is of small capacity, fluid will be supplied to the valve chamber 28 and the pressure chamber 37 at a slow rate.

After a period of time the automatic brake valve device is turned to the running position, in which position fluid is supplied to the brake pipe at the pressure supplied by the feed valve device, which is several pounds less than the pressure at which fluid is supplied directly from the main reservoir, with the result that there will be a reduction in the pressure of the fluid in the chamber 22 and the piston 20 will be moved by the spring 260 and the fluid in the valve chamber 28 from the inner release position to the outer release position in which it is shown in Fig. 4 of the drawings, in which position the piston 20 is out of engagement with the seat rib 51 on the gasket 50 so that fluid under pressure from the chamber 22 may flow through the feed groove 200 and past the seat rib 51 to the valve chamber 28 and to the pressure chamber 37.

The feed groove 200 is of substantially greater flow capacity than the restricted passage 199, and when the piston 20 is in the position in which it is shown in Fig. 4 of the drawings fluid under pressure will be supplied from the chamber 22 to the valve chamber 28 at a more rapid rate than is permitted by the restricted passage 199.

When a locomotive is employed in passenger service, in which service trains are much shorter than freight trains, the automatic brake valve device is left in the release position a much shorter period of time than when the locomotive is employed in freight train service, with the result that there is less danger of producing an over-charge of the pressure chamber 37, and hence a more rapid rate of flow of fluid to this chamber may be employed than is permitted by the restricted passage 199, and in the brake equipment provided by this invention the charging control valve device 16 is provided to optionally vary the rate at which fluid is supplied from the chamber 22 to the valve chamber 28 and to the pressure chamber 37.

The charging control valve device 16 is shown in Fig. 4 of the drawings in a position to condition the equipment for freight train service, that is to restrict the rate of flow of fluid from the chamber 22 to the valve chamber 28, and at this time the plug valve 206 is in the position to cut off the flow of fluid through the passage 204.

In order to condition the equipment for passenger train service the handle 208 is turned to the lower position, in which position the passage 210 in the plug valve 206 establishes communication through the passage 204 to the valve chamber 193, with the result that on movement of the piston 20 into engagement with the seat rib 51 on the gasket 50, fluid under pressure may flow from the chamber 22 by way of the passage 204 past the ball check valve 202 to the chamber 193, and therefrom by way of passage 195 through the restricted passage 196 to the valve chamber 28 and to the pressure chamber 37. The rate of flow of fluid to the pressure chamber 37 will then be determined by the combined capacity of the restricted passages 196 and 199 and will be substantially greater than the rate of flow of fluid permitted by the restricted passage 199 alone.

With the charging control valve device 16 in the position to condition the equipment for passenger train service, on the venting of fluid from the brake pipe 25, fluid will be vented from the chamber 22. The ball check valve 202 then operates to prevent the flow of fluid from the valve chamber 28 to the piston chamber 22 by way of the passage 195 and the passage 204, so that the rate at which fluid must be released from the chamber 22 to produce an application of the brakes will not be affected by the back flow of fluid from the pressure chamber to the chamber 22 through the charging control valve device 16.

*Emergency applications of the brakes*

The distributing valve device 1 is provided with an emergency change-over brake cylinder build-up valve device 15, which is operative to condition the equipment to permit either a rapid build-up of brake cylinder pressure or a restricted build-up of brake cylinder pressure on an emergency application of the brakes.

In order to condition the equipment to restrict the rate of build-up of brake cylinder pressure the handle 224 of the change-over valve device 8 is turned to the position in which it is shown in the drawings, in which position the plug valve 220 is in the position in which the angular passage 222 establishes communication between the pipe 215 and the delay control pipe 164 so that fluid under pressure from the main reservoir is supplied to the chamber 162 on the spring side of the piston 160, while fluid under pressure at main reservoir pressure is supplied from the pipe and passage 90 by way of the passage 170 to the valve chamber 166 on the opposite side of the piston 160, and, the pressures on opposite sides of the piston being substantially equal, the piston 160 will be maintained by the spring 172 in the lower position as shown in Fig. 5 of the drawings.

In order to effect an emergency application of the brakes the independent brake valve device is left in the running position, while the automatic brake valve device is turned to the emergency position, in which position fluid under pressure is rapidly vented from the brake pipe 25 through the pipe 236 by way of ports and passages, (not shown), in the automatic portion of the brake valve device, while a port 265 in the rotary valve 232 establishes communication between the passage 252 and the passage 238 so that fluid under pressure at the pressure supplied by the feed valve 4 is supplied to the application pipe 150.

On the release of fluid from the brake pipe 25 at an emergency rate, the pressure of the fluid in the chamber 22 of the equalizing portion of the distributing valve device 1 will be rapidly reduced and the piston 20 will be moved by the fluid under pressure in the valve chamber 28 into engagement with the gasket 41, the piston overcoming the resistance offered by the spring pressed stop 44.

This movement of the piston 20 causes the slide valve 29 to move to a position in which a port 270 establishes communication between the passage 104 and an atmospheric exhaust passage 272 so that fluid in the chamber 102 of the reduction limiting and control valve device 12 is released to the atmosphere.

On a reduction in the pressure of the fluid in the chamber 102, the piston 100 is moved by the fluid under pressure in the chamber 106 supplied thereto by means, not shown, on movement of the slide valve 29 to an application position, so as to compress the spring 112 and to move the slide valve 108 to the position in which it is shown in Fig. 5 of the drawings. In this position of the slide valve 108, the end of the slide valve uncovers a passage 274 which communicates with the valve chamber 28 of the equalizing portion of the distributing valve device 1, and fluid under pressure will thereupon be supplied from the pressure chamber 37 by way of the passage 274 to the chamber 106 so as to maintain the pressure of the fluid in this chamber and thereby maintain the piston 100 in the position in which it is shown in the drawings.

In addition, when the slide valve 108 is moved to the position in which it is shown in Fig. 5 of the drawings, a cavity 276 in the slide valve 108 establishes communication between a passage 278, which communicates with the passage 178, and a passage 280, which communicates with a port in the seat of the slide valve 29.

When the slide valve 29 is in the emergency position, as shown in Fig. 5 of the drawings, a port 282 therein establishes communication between the passage 280 and a passage 284 which leads to the safety valve device 14, while, in addition, another branch of the port 282 communicates with the valve chamber 28.

In the emergency position of the slide valve 29 a cavity 290 establishes communication between the passage 178 and the passage 33 which leads from the slide valve chamber 28.

On movement of the slide valve 29 to the emergency position, therefore, fluid under pressure from the pressure chamber 37 and the valve chamber 28 flows by way of the passage 33 and the cavity 290 in the slide valve 29 to the passage 178 which leads to the emergency change-over brake cylinder build-up valve device 15, while fluid will also be supplied from the valve chamber 28 by way of the passage 282 in the slide valve 29 to the passage 280 and through the cavity 276 in the slide valve 108 of the reduction limiting and control valve device 12 to the passage 278, and therefrom to the passage 178 which leads to the emergency change-over brake cylinder build-up valve device 15.

At the same time, as the automatic brake valve device 2 is in the emergency position, fluid under pressure is supplied to the application pipe 150, as described above, and fluid which is supplied to this pipe flows by way of the passage 150 in the distributing valve device 1 to the chamber 147, and on an increase in the pressure of the fluid in this chamber, the valve 154 is moved away from the seat rib 158 against the spring 156 so as to permit fluid to flow from the chamber 147 to the chamber 152, from which it flows by way of a passage 295 to the passage 278.

Fluid which is supplied from the passage 295 to the passage 278 may flow in one direction through the passage 278 to the passage 178 through which it may flow either to the valve chamber 28 or to the valve device 15, and therefrom to the chamber 61 of the application portion 11. Fluid supplied to the passage 278 may flow in the opposite direction through the cavity 276 in the slide valve 108 to the passage 280, and therefrom to the passage 282 in the slide valve 29, from which it may flow either to the safety valve 14 by way of the passage 284 or to the valve chamber 28.

With the valve device 15 in the delay position fluid which is supplied to the passage 178 flows by way of the restricted passage 300 to the passage 190 which leads to the chamber 61 of the application portion 11. Fluid which flows through the restricted passage 300 also flows by way of a cavity 301 in the slide valve 168 to a passage 302 which communicates with the application chamber 303.

The pressure of the fluid in the chamber 61 of the application portion of the distributing valve device 1 will increase at a slow rate because of the restricted rate of flow of fluid through the restricted passage 300, and because of the flow of fluid to the application chamber 303.

On an increase in the pressure of the fluid in the chamber 61, the piston 60 is moved to the right as viewed in Fig. 5 of the drawings and moves the slide valve 65 to a position to lap the passages 72 and thereby cut off communication between the brake cylinder and the atmosphere, and, on further movement of the piston 60, the end of the stem 67 engages the end of the stem of the pilot valve 94 and moves the pilot valve against the spring 97 and away from the seat rib 96 on the member 92. Fluid under pressure in the chamber 86 on the spring side of the valve piston 76 is thereupon released to the slide valve chamber 63, and on a reduction in the pressure of the fluid in the chamber 86, which will occur because of the restricted rate of flow of fluid thereto through the passage 88, the fluid under pressure in the chamber 85 acting on the face of the valve piston 78 outwardly of the seat rib 80 will move the valve piston against the spring 82 and away from the seat rib 80 so that fluid from the main reservoir supplied by way of passage 90 to the chamber 85 may flow at a rapid rate past the seat rib 80 to the slide valve chamber 63 and therefrom by way of the passage 70 to the brake cylinder.

The application portion 11 operates in the well known manner to supply fluid under pressure to the brake cylinder so as to increase the pressure of the fluid in the brake cylinder in accordance with the rate of increase in the pressure of the fluid supplied to the piston chamber 61. On an increase in the pressure of the fluid in the brake cylinder to a value substantially equal to or slightly greater than the pressure of the fluid in the piston chamber 61, the piston 60 will be moved by the fluid under pressure in the chamber 63 to the left, as viewed in Fig. 5 of the drawings, to the lap position in which position the end of the piston stem 67 is disengaged from the face of the member 92 associated with the valve piston 78 and from the end of the stem of the pilot valve 94, thereby permitting the spring 82 to move the valve piston 78 into engagement with the seat rib 80 and permitting the spring 97 to move the pilot valve 94 into engagement with the seat rib 96 so as to cut off the further supply of fluid under pressure to the brake cylinder.

After a time interval the flow of fluid from the pressure chamber 37 to the piston chamber 61 of the application portion will be terminated due to the increase in the pressure of the fluid in the piston chamber 61 to a value substantially equal to that in the pressure chamber 37. Fluid under pressure will continue to be supplied by way of the application pipe 150, however, and will increase the pressure of the fluid in the piston chamber 61, and also in the passage 284 leading to the safety valve device 14, until the pressure established in the passage 284 is substantially equal to that for which the safety valve is adjusted to respond, whereupon the safety valve 14 will operate to release fluid under pressure from the passage 284 and thereby prevent a further increase in the pressure of the fluid in this passage.

It will be seen that the application pipe 150 supplies fluid under pressure to the passage 295 which communicates with the passage 278 which permits fluid to flow in opposite directions from the passage 295 and that the passage 278 may be considered as branches of the passage 295. It will be seen also that each of these branches communicates with the valve chamber 28, one of these branches communicating with the valve chamber by way of the passage 178, the cavity 299 in the slide valve 29, and the passage 33. The other branch communicates with the valve chamber 28 by way of the passage 278, the cavity 276 in the slide valve 108, the passage 280, and the port 282 in the slide valve 29.

As each of the branches of the passage 295 to which fluid is supplied by the application pipe 150 is in communication with the valve chamber 28 the pressure which is established in either of these branches will be substantially equal to the pressure which is established in the other of these branches.

One of the branches leading from the passage 295 communicates with the application piston chamber 61 by way of the passsage 178 and the valve device 15, while the other branch leading from the passage 295 communicates with the safety valve device 14 by way of the passage 284. As the pressure established in either of these branches is substantially equal to that established in the other of the branches, the pressure supplied by one branch to the application piston chamber 61 will be substantially equal to that supplied by the other branch to the safety valve device 14, and hence the pressures supplied to the piston chamber 61 and to the safety valve device 14 will be substantially equal.

Upon an increase to a predetermined value in the pressure of the fluid supplied to the safety valve device 14, the safety valve device operates to release fluid under pressure from the passage 284 to the atmosphere and thereby prevent a further increase in the pressure of the fluid in the passage 284, and also in the valve chamber 28, and thereby prevent a further increase in the pressure of the fluid supplied to the application piston chamber 61.

The application portion operates as described above to cut off the supply of fluid under pressure to the brake cylinder when the pressure of the fluid supplied to the brake cylinder has increased to a value substantially equal to the pressure of the fluid in the piston chamber 61, and as this pressure is governed by the setting of the safety valve, the pressure which is established in the brake cylinder is regulated by the safety valve device 14.

When it is desired to condition the equipment to permit a rapid increase in the rate of build-up of brake cylinder pressure, the handle 224 of the delay control valve 8 is turned from the position in which it is shown in Fig. 1 of the drawings, to the position indicated by broken lines. In this position of the handle 224, the plug valve 220 is in a position to prevent the flow of fluid from the main reservoir by way of the pipe 265 to the delay control pipe 164, while the angular passage 222 in the plug valve 220 establishes communication between the delay control pipe 164 and the atmospheric exhaust port 218 so as to release the fluid in the delay control pipe, and on the reduction in the pressure of the fluid in the chamber 162 of the valve device 15, the piston 160 is moved against the spring 172 by the fluid under pressure in the chamber 166.

When the piston 160 is moved to its upper position the slide valve 168 is moved to a position in which the cavity 301 no longer establishes communication between the passage 199 and the passage 302, and in which a cavity 305 in the slide valve establishes communication between the end of the passage 178 and the passage 190 so as to by-pass the restricted passage 300. Fluid supplied to the passage 178 may, therefore, flow to the application piston chamber 61 at a rapid rate, thereby quickly increasing the pressure of the fluid in this chamber, and causing the application portion to operate in the usual manner to effect a rapid increase of the pressure of the fluid supplied to the brake cylinder.

*Release of the brakes after an emergency application*

Figures 2, 3:
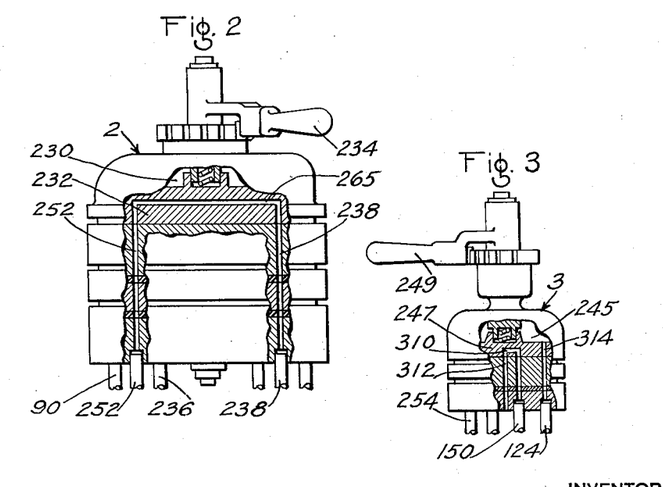
Fig. 2 is a view partly in section of the automatic brake valve device employed in the equipment shown in Fig. 1.
Fig. 3 is a view partly in section of the independent brake valve device employed in the equipment shown in Fig. 1.

After an emergency application the locomotive brakes may be released by operation of either the automatic brake valve device or the independent brake valve device. If it is desired to release the brakes on the locomotive while maintaining the brakes applied on the train, the automatic brake valve device is left in the emergency position, in which position fluid under pressure is supplied to the passage and pipe 238 which communicates with the application pipe 150. The independent brake valve device is turned to the release position as shown in Fig. 3 of the drawings, and in this position of the independent brake valve device a port 310 in the rotary valve 247 establishes communication between the application pipe and passage 150 and a port 312 leading to the atmosphere so as to release fluid under pressure from the application pipe 150. The ports in the independent brake valve device are of sufficient flow capacity to release the fluid which is already present in the application pipe 150 and also that which is supplied thereto from the automatic brake valve device by way of the pipe 238.

In addition, when the independent brake valve device is turned to the release position, fluid under pressure from the chamber 245, which is supplied thereto from the reducing valve device 5 by way of the pipe 254, flows through a port 314 in the rotary valve 247 to the independent release pipe 124. Fluid which is supplied to the independent release pipe 124 flows to the passage 123 in the distributing valve device 1 and to the chamber 121 of the release valve device 13, and, on an increase in the pressure of the fluid in this chamber, the piston 120 is moved to the left, as viewed in Fig. 5 of the drawings, into engagement with the seat rib 132 on the gasket 130 so as to cut off communication between the area outwardly of the seat rib 132 and the area inwardly thereof which is in communication with the atmosphere by way of the atmospheric exhaust passage 127, and thus prevent the escape of fluid from the chamber 121 to the atmosphere past the piston 120.

When the piston 120 is moved into engagement with the seat rib 132 the end of the stem 138 engages the valve 154 and moves this valve against the spring 156 away from the seat rib 158, thereby establishing communication between the chamber 152 and the chamber 147.

On movement of the valve 154 away from the seat rib 158 fluid under pressure from the piston chamber 61 of the application portion 11 is permitted to escape to the atmosphere by way of the passage 190, the connecting passage 188 in the valve device 15, past the ball check valve 185, past the valve 180 which is lifted away from the seat rib 183 against the spring 181, and to the chamber 175 which communicates by way of a passage 176 with the passage 178 so as to by-pass the restricted passage 300. Fluid under pressure from the passage 190 may also flow to the passage 178 through the restricted passage 300, while, assuming that the piston 160 and the slide valve 168 are in the position in which they are shown in Fig. 5 of the drawings, fluid under pressure from the application chamber 303 may flow by way of the passage 302 and the cavity 301 in the slide valve 168 to the passage 188 and past the check valves 185 and 180 to the passage 178, or through the restricted passage 300 to the passage 178. From the passage 178 fluid released from the piston chamber 61 flows to the passage 278 and to the connecting passage 295 which leads to the chamber 152, from which the fluid flows past the seat rib 158 to the chamber 147 and therefrom by way of the passage 150 and the application pipe 150 through the port 310 in the rotary valve 247 of the independent portion of the brake valve device and to the atmosphere by way of the passage 312.

Upon a reduction in the pressure of the fluid in the piston chamber 61 of the application portion 11, the fluid under pressure in the valve chamber 63 moves the piston 60 to the left as viewed in Fig. 5 of the drawings, and this movement of the piston 60 moves the slide valve 65 to a position to release fluid from the slide valve chamber 63 and from the brake cylinder through the atmospheric exhaust passages 72, thus reducing the pressure of the fluid in the brake cylinder.

The application portion 11 operates in the well known manner to effect a reduction in the pressure of the fluid in the brake cylinder at a rate substantially equal to the rate at which the pressure of the fluid in the piston chamber 61 is reduced. In the improved brake equipment provided by this invention, with the brake cylinder build-up valve device 15 in a position to condition the equipment to retard the rate of brake cylinder build-up, a by-pass passage is provided through which fluid under pressure may be released at a more rapid rate than the rate at which fluid is supplied to the application piston chamber, with the result that the rate at which fluid may be released from the piston chamber 61 is not restricted by the capacity of the passages through which fluid is supplied thereto. This by-pass passage comprises the passages 188 and 176 with the check valves 185 and 180 for preventing back flow.

When the emergency change-over brake cylinder build-up valve device 15 is in a position to condition the equipment to restrict the rate of increase in the pressure of the fluid supplied to the brake cylinder, therefore, the time required to effect the release of the brakes will not be affected and the brakes may be released very rapidly by the release of fluid through the by-pass passage which extends around the restriction in the passage which limits the rate of flow of fluid to the piston chamber of the application portion.

This by-pass passage is provided with a check valve so that on an application of the brakes fluid under pressure cannot flow through this passage to the piston chamber of the application portion with the result that the rate of flow of fluid to the piston chamber will be governed by the capacity of the restricted passage which is provided in this equipment.

While one embodiment of the improved brake equipment provided by my invention has been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. In a fluid pressure brake, a brake cylinder, a brake pipe, valve means operative on an increase in the pressure of the fluid supplied thereto to supply fluid under pressure to the brake cylinder and operated upon a reduction in the pressure of the fluid supplied thereto to release fluid from the brake cylinder, a valve device operative on a reduction in the pressure of the fluid in the brake pipe to supply fluid to the said valve means and operative on an increase in the pressure of the fluid in the brake pipe to release fluid from the said valve means, valve mechanism operative in one position to restrict the rate of flow of fluid from the valve device to the valve means, and operative in another position to permit the rapid flow of fluid from said valve device to said valve means, and means for permitting the rapid flow of fluid from said valve means in either of said positions.

2. In a fluid pressure brake, a brake cylinder, a brake pipe, valve means operative on an increase in the pressure of fluid supplied thereto to supply fluid under pressure to the brake cylinder, and operative on a reduction in the pressure of the fluid supplied thereto to release fluid from the brake cylinder, a valve device operated upon a reduction in the pressure of the fluid in the brake pipe to supply fluid under pressure to a passage through which fluid may be supplied to the valve means and operated on an increase in the pressure of the fluid in the brake pipe to release fluid from said passage, a choke interposed in said passage and operative to restrict the rate of flow of fluid through said passage, a by-pass passage extending around said choke, and valve means operative to permit fluid to flow from said valve means through said by-pass passage, and operative to prevent back flow of fluid to said valve means through said by-pass passage.

3. In a fluid pressure brake, a brake cylinder, a brake pipe, valve means operative on an increase in the pressure of the fluid supplied thereto to supply fluid under pressure to the brake cylinder and operative on a reduction in the pressure of the fluid supplied thereto to release fluid from the brake cylinder, a valve device operative on a reduction in the pressure of the fluid in the brake pipe to supply fluid to said valve means and operative on an increase in the pressure of the fluid in the brake pipe to release fluid from said valve means, and valve mechanism operative in one position to effect the supply of fluid to said valve means by said valve device by way of a passage having means interposed therein and operative to restrict the rate of flow of fluid to the valve means to a given rate and to effect the release of fluid from said valve means by said valve device by way of a passage adapted to permit fluid to flow from the valve means at a rate more rapid than the given rate, and operative in another position to permit fluid to flow to and from the valve means at a more rapid rate than said given rate.

4. In a fluid pressure brake, a brake cylinder, a brake pipe, valve means operative on an increase in the pressure of the fluid supplied thereto to supply fluid under pressure to the brake cylinder and operative on a reduction in the pressure of the fluid supplied thereto to release fluid from the brake cylinder, a valve device operative on a reduction in the pressure of the fluid in the brake pipe to supply fluid to said valve means and operative on an increase in the pressure of the fluid in the brake pipe to release fluid from the valve means, valve mechanism operative in one position to effect the supply and release of fluid under pressure to and from the valve means by said valve device by way of one passage and in another position by way of another passage, one of said passages having means interposed therein and operative to restrict the rate of flow of fluid therethrough, a passage associated with said last-named passage and by-passing said means to restrict the rate of flow of fluid through said passage, and a check valve interposed in said passage and operative to permit fluid to flow from said valve means and operative to prevent back flow of fluid to said valve means.

5. In a locomotive fluid pressure brake, in combination, a brake cylinder, a distributing valve device for controlling the supply and release of fluid under pressure to and from the brake cylinder and including an application portion operated upon an increase in fluid pressure for supplying fluid under pressure to the brake cylinder and upon a reduction in fluid pressure for releasing fluid from the brake cylinder, and means for restricting the rate at which fluid is supplied to said application portion and having a communication through which fluid is released from the application portion at a more rapid rate.

6. In a locomotive fluid pressure brake, in combination, a brake cylinder, a distributing valve device for controlling the supply and release of fluid under pressure to and from the brake cylinder and including an application portion operated upon an increase in fluid pressure for supplying fluid under pressure to the brake cylinder and upon a reduction in fluid pressure for releasing fluid from the brake cylinder, and a valve device having one position in which the rate at which fluid is supplied to said application portion is restricted and another position in which fluid is supplied to said application portion at a more rapid rate, and having a communication through which fluid is released from said application portion at a rapid rate.

7. In a fluid pressure brake, in combination, a brake pipe, a brake cylinder, a pressure chamber, a movable abutment subject to the opposing pressures of the fluid in the brake pipe and in the pressure chamber, valve means operated by said abutment and controlling the supply of fluid to and the release of fluid from the brake cylinder, said abutment also controlling a plurality of passages through which fluid may be supplied from the brake pipe to the pressure chamber, and a check valve interposed in one of said passages and operative to permit fluid to flow from the brake pipe to the pressure chamber and to prevent back flow of fluid from the pressure chamber to the brake pipe through said passage.

8. In a fluid pressure brake, in combination, a brake pipe, a brake cylinder, a pressure chamber, a movable abutment subject to the opposing pressures of the fluid in the brake pipe and in the pressure chamber, valve means operated by said abutment and controlling the supply of fluid to and the release of fluid from the brake cylinder, said abutment also controlling a plurality of passages through which fluid may be supplied from the brake pipe to the pressure chamber, valve means associated with one of said passages and operative to cut off the flow of fluid through said passage or to permit the flow of fluid through said passage, and a check valve interposed in said passage and operative to permit fluid to flow from the brake pipe to the pressure chamber through said passage and to prevent back flow of fluid from the pressure chamber to the brake pipe through said passage.

9. In a fluid pressure brake, in combination, a brake pipe, a brake cylinder, a pressure chamber, a movable abutment subject to the opposing pressures of the fluid in the brake pipe and in the pressure chamber, valve means operated by said abutment and controlling the supply of fluid to and the release of fluid from the brake cylinder, said abutment also controlling a passage through which fluid may be supplied from the brake pipe to the pressure chamber, a check valve interposed in said passage and operative to permit fluid to flow from the brake pipe to the pressure chamber through said passage and to prevent back flow of fluid from the pressure chamber to the brake pipe through said passage, and optionally operable means to vary the rate of flow of fluid through said passage.

10. In a fluid pressure brake, in combination, a brake pipe, a brake cylinder, a pressure chamber, a valve device subject to the opposing pressures of the brake pipe and said pressure chamber for controlling the supply and release of fluid to and from the brake cylinder, a passage having a restricted flow portion and through which fluid under pressure is supplied from the brake pipe to said chamber, an additional passage through which fluid is supplied from the brake pipe to said chamber, a check valve interposed in said additional passage and operative to permit fluid to flow from the brake pipe to the pressure chamber through said additional passage, and to prevent back flow of fluid from the pressure chamber to the brake pipe through said additional passage, and manually controlled valve means for controlling communication through said additional passage.

11. In a fluid pressure brake, in combination, a brake pipe, a brake cylinder, a pressure chamber, a valve device subject to the opposing pressures of the brake pipe and said pressure chamber for controlling the supply and release of fluid to and from the brake cylinder, a passage having a restricted flow portion and through which fluid under pressure is supplied from the brake pipe to said chamber, an additional passage having a restricted flow portion and through which fluid is supplied from the brake pipe to said chamber, a check valve interposed in said additional passage and operative to permit fluid to flow from the brake pipe to the pressure chamber through said additional passage, and to prevent back flow of fluid from the pressure chamber to the brake pipe through said additional passage, and a manually operable valve for opening and closing communication through said additional passage.

12. In a fluid pressure brake, in combination, a brake cylinder, a brake pipe, a pressure chamber, a safety valve, valve means operative on an increase in the pressure of the fluid supplied thereto to supply fluid to the brake cylinder, a valve device subject to the opposing pressures of the fluid in the brake pipe and in the pressure chamber and operative on a reduction in the pressure of fluid in the brake pipe at an emergency rate to establish communication between the pressure chamber and said valve means and between the pressure chamber and the safety valve, and a brake valve device operative on movement to the emergency position to vent fluid from the brake pipe at an emergency rate and to supply fluid under pressure to a branched passage, one branch of said passage communicating with the pressure chamber and with the safety valve, the other branch of said passage communicating with said valve means and with said pressure chamber.

13. In a fluid pressure brake, in combination, a brake cylinder, a brake pipe, a pressure chamber, a safety valve, valve means operative on an increase in the pressure of the fluid supplied thereto to supply fluid to the brake cylinder, a valve device subject to the opposing pressures of the fluid in the brake pipe and in the pressure chamber and operative on a reduction in the pressure of fluid in the brake pipe at an emergency rate to establish communication between the pressure chamber and said valve means and between the pressure chamber and the safety valve, and a brake valve device operative on movement to the emergency position to vent fluid from the brake pipe at an emergency rate and to supply fluid under pressure to a passage which communicates with a supply passage through which fluid may be supplied to the safety valve and to the pressure chamber and which supply passage also communicates with a passage through which fluid may be supplied to the said valve means and to the pressure chamber.

14. In a fluid pressure brake, in combination, a brake cylinder, a brake pipe, a pressure chamber, a safety valve, valve means operative on an increase in the pressure of the fluid supplied thereto to supply fluid under pressure to the brake cylinder, a valve device subject to the opposing pressures of the fluid in the brake pipe and in the pressure chamber and operative on a reduction in the pressure of the fluid in the brake pipe at an emergency rate to establish communication between the pressure chamber and the valve means, a brake valve device operative on movement to the emergency position to vent fluid from the brake pipe at an emergency rate and to supply fluid to a supply passage which communicates with a passage which communicates with the valve means and with said chamber, and which supply passage also communicates with a passage which communicates with the safety valve and with the said chamber.

15. In a fluid pressure brake, in combination, a brake cylinder, a brake pipe, a pressure chamber, a safety valve, application valve means operative on an increase in the pressure of the fluid supplied thereto to supply fluid to the brake cylinder, an application pipe, valve means subject to the opposing pressures of the fluid in the brake pipe and in the pressure chamber and operative on a reduction in the pressure of the fluid in the brake pipe at an emergency rate to establish communication between the application pipe and the application valve means and also to establish communication between the application pipe and the safety valve, a brake valve device operative on movement to the emergency position to vent fluid from the brake pipe at an emergency rate and to supply fluid to the application pipe, and means to control the supply of fluid from the application pipe to the safety valve and to the application valve means, whereby the pressures of the fluid supplied to the application valve means and to the safety valve are substantially equal.

16. In a fluid pressure brake, in combination, a brake cylinder, a brake pipe, a pressure chamber, a safety valve, application valve means operative on an increase in the pressure of the fluid supplied thereto to supply fluid to the brake cylinder, an application pipe, valve means subject to the opposing pressures of the fluid in the brake pipe and in the pressure chamber and operative on a reduction in the pressure of the fluid in the brake pipe at an emergency rate to establish communication between the application pipe and the application valve means and also to establish communication between the application pipe and the safety valve, a brake valve device operative on movement to the emergency position to vent fluid from the brake pipe at an emergency rate and to supply fluid to the application pipe, and means to control the supply of fluid from the application pipe to the safety valve and to the application valve means, whereby the pressures of the fluid supplied to the application valve means and to the safety valve are substantially equal, said means comprising passages communicating with a chamber and with the passages leading to the application valve means and the safety valve.

17. In a fluid pressure brake, in combination, a brake cylinder, a brake pipe, a pressure chamber, an application pipe, valve means operative on an increase in the pressure of the fluid supplied thereto to supply fluid under pressure to the brake cylinder, a valve device subject to the opposing pressures of the fluid in the brake pipe and in the pressure chamber and operative on a reduction in the pressure of the fluid in the brake pipe at an emergency rate to establish communication between the pressure chamber and said valve means and between the pressure chamber and the safety valve, said valve device also establishing communication between the application pipe and the safety valve, means for establishing communication between the application pipe and said valve means, and a brake valve device operative on movement to the emergency position to vent fluid from the brake pipe at an emergency rate and to supply fluid under pressure to the application pipe.

18. In a fluid pressure brake, in combination, a brake cylinder, a brake pipe, a pressure chamber, a safety valve, valve means operative on an increase in the pressure of the fluid supplied thereto to supply fluid under pressure to the brake cylinder, a supply passage communicating with said valve means, a valve device subject to the opposing pressures of the fluid in the brake pipe and in said pressure chamber and operative on a reduction in the pressure of the fluid in the brake pipe at an emergency rate to establish communication between the pressure chamber and the valve means, the valve device in the emergency position also establishing communication from a vent passage to said safety valve and from said pressure chamber to said safety valve, means for establishing communication from said supply passage to said vent passage, and a brake valve device operative on movement to the emergency position to vent fluid from the brake pipe at an emergency rate and to supply fluid under pressure to said supply passage.

CHARLES H. McKINSTRY.